United States Patent [19]
Kendili

[11] Patent Number: 5,378,258
[45] Date of Patent: Jan. 3, 1995

[54] METHOD AND AN INSTALLATION FOR PRODUCING GRANULATED TRIPLE SUPERPHOSPHATE (TSP)

[75] Inventor: El Hadi Kendili, Safi, Morocco

[73] Assignee: Maroc- Chimie, Casablanca, Morocco

[21] Appl. No.: 911,193

[22] Filed: Jul. 9, 1992

[30] Foreign Application Priority Data

Jul. 11, 1991 [FR] France ................. 91 08732

[51] Int. Cl.⁶ .............. C05B 1/02; C01B 15/16; C01B 25/26
[52] U.S. Cl. ............................... 71/41; 71/43; 71/44; 71/64.08; 423/309; 423/311; 423/319
[58] Field of Search ............ 71/41, 43, 44, 64.08; 423/309, 311, 319

[56] References Cited
U.S. PATENT DOCUMENTS

| | | | |
|---|---|---|---|
| 2,240,115 | 3/1956 | Facer | 71/41 |
| 2,528,514 | 11/1950 | Harvey et al. | 71/41 |
| 2,913,330 | 11/1959 | Wilson | 71/41 |

Primary Examiner—Ferris Lander
Attorney, Agent, or Firm—Michael N. Meller

[57] ABSTRACT

A method and an installation for producing granulated triple superphosphate wherein a premixer for phosphate and a phosphoric acid solution includes unclogging means comprising in combination a flexible axial sleeve of non-vulcanized elastomer for injecting phosphate together with at least one sprayer for spraying the phosphoric acid solution and acting level with the free bottom end of the sleeve. The invention is applicable to the chemical industry.

2 Claims, 4 Drawing Sheets

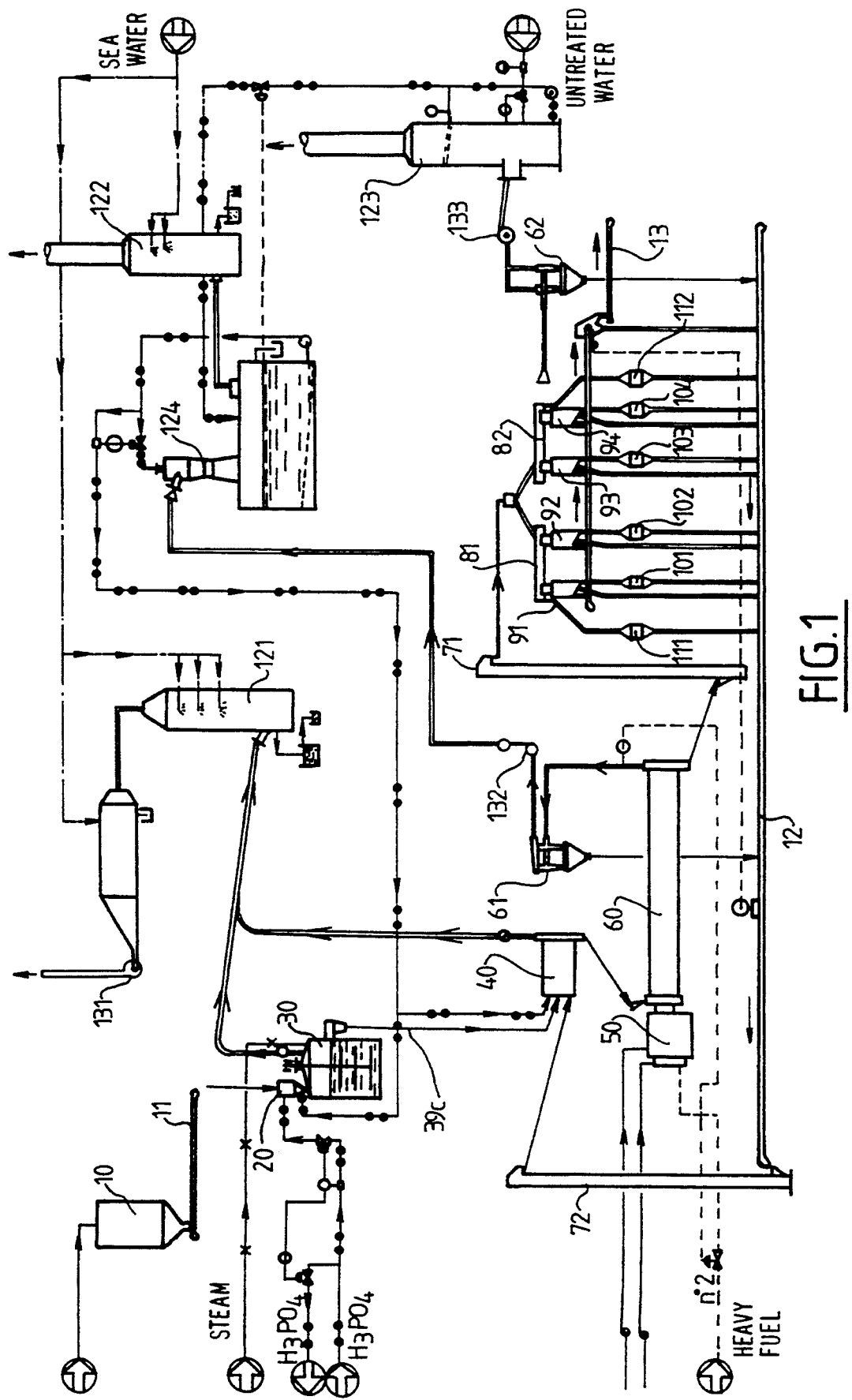

METHOD AND AN INSTALLATION FOR PRODUCING GRANULATED TRIPLE SUPERPHOSPHATE (TSP)

The present invention relates to a method and an installation for producing granulated triple superphosphate (TSP).

BACKGROUND OF THE INVENTION

To obtain a better understanding of the contribution of the present invention to the state of the art in question, it should be observed that the rate at which a solution of phosphoric acid reacts with phosphate depends, amongst other things, on a good distribution of phosphate grains in the acid solution. The function of this reaction is to transform the phosphorous contained in the ore in a form that cannot be assimilated by plants into another form that can be assimilated.

Inserting phosphate directly into a reaction tank, i.e. into a reactor having a stirred reaction tank, would give rise:

firstly to a drop in the rate at which phosphate is converted because a portion of the phosphate would leave the reactor without reacting; and secondly to losses due to phosphate escaping in the waste gases.

That is why a premixer is used to mix the granulated phosphate and the phosphoric acid solution prior to entering the reaction tank. However, although it is true that a conventional premixer enables the phosphate to be wetted, use thereof gives rise in turn to problems such as blocking or clogging of the premixer and to gases and vapors being given off thereby, thus interfering with operation and requiring frequent unclogging to be performed.

An object of the present invention is to eliminate these drawbacks of the methods and installations used in the prior art and it seeks to provide a method and an installation for producing granulated TSP that are substantially improved, that satisfy practical requirements better than previously known methods and installations, in particular in that:

1) present improved granulation efficiency ensuring good physical quality to the finished product with a recycling rate close to three;
2) only a small amount of dust is produced and it is suitable for proper disposal with anti-pollution standards being guaranteed in each case;
3) only a small amount of energy is required to implement the method and the equipment required is simple, reliable, and compact;
4) the method guarantees an increase in the capacity of units already in service in the range 30% to 100%;
5) above all, the method makes it possible, by using appropriate equipments, to avoid the problems usually encountered in the slurry circuits, in particular blocking or clogging by the slurry setting, and also the presence of pockets of gas and pumping;
6) the solution adopted enables starting and stopping to be performed rapidly while also making production easy to run;
7) the method can be adapted to installations that are already in service; and
8) the solution adopted is also remarkable in that it prevents return of the reaction gases.

SUMMARY OF THE INVENTION

The present invention provides a method of producing granulated triple superphosphate (TSP), comprising the following steps:

i. preparing a slurry of previously ground phosphate and a solution of phosphoric acid;
ii. granulating the slurry;
iii. drying the granulated product;
iv. separating the granulated product by grain size;
v. disposing of and scrubbing waste gases; and
iv. recycling rejected finished product after grain size separation;

wherein step i includes an operation of unclogging a premixer for the phosphate and the acid and situated upstream from a reactor having a reaction tank in which the acid solution attacks the granulated phosphate, which unclogging operation is performed by guided insertion of the previously ground and measured-out phosphate along a deformable axial path into the premixer and by spraying the phosphoric acid solution onto the phosphate at the end of the guided axial insertion path.

In this manner, it is possible to perform granulation with optimum efficiency giving rise to a recycling rate that is close to three, which value is considerably better than the prior art value which lies in the range 5 to 5.5.

In accordance with the invention, the angle between the spraying direction and the guided axial insertion path for the phosphate is greater than 60° and may reach about 75°.

The present also provides an installation for producing granulated triple superphosphate (TSP), comprising the following devices:

measuring-out equipment for measuring out previously ground phosphate;
a premixer for mixing the ground phosphate as measured out with a solution of phosphoric acid, the premixer having a cylindrical top portion running into a tapering bottom portion;
a stirred-tank reactor receiving the phosphate and the phosphoric acid solution premixed in this way and intended to allow the phosphoric acid to attack the phosphate;
a granulating drum for granulating the slurry leaving reactor;
a drying device for drying the product granulated in this way;
a plurality of separators for separating said granulated product by grain size;
scrubbing devices for scrubbing the reaction gases, the drying gases, and the waste gases from the various apparatuses and the workshop; and
a recycling circuit for recycling to the granulating drum rejected finished product after grain size separation;

wherein the premixer includes unclogging means comprising in combination a flexible and resilient axial sleeve, in particular fixed to the top of the premixer by a collar and intended to receive the previously ground and measured-out phosphate, and at least one phosphoric acid solution sprayer injecting the acid solution under pressure level with the free bottom end of the sleeve, said sleeve including at least one slot giving access to the sprayed phosphoric acid solution and also constituting a non-return valve for reaction gases under the effect of the injected phosphoric acid and of its own resilience.

In a preferred embodiment of the installation of the invention, the sleeve constituting the unclogging means and the non-return valve is made of a non-vulcanized elastomer.

In another preferred embodiment of the installation of the invention, the stirred-tank reactor includes an overflow chute engaged against an overflow opening for the slurry that accumulates in the reaction tank, which chute includes two tapering openings enabling the reaction gases that are given off during flow towards the granulating drum to be separated out.

In yet another embodiment of the installation of the invention, the granulating drum co-operates with a sprayer for spraying the slurry coming from the overflow chute of the reactor, said sprayer being constituted by a tubular body terminated by an end whose profile enables a fan of slurry be distributed inside the granulating drum while also maintaining a constant spraying speed by varying the section of the flow, for which purpose said end has a composite profile defined by a sloping cutout sloping relative to the axis of the tubular body and by an arcuate cutout following on from the above cutout and connected thereto.

In addition to the above dispositions, the invention includes other dispositions which appear from the following description.

BRIEF DESCRIPTION OF THE DRAWINGS

An embodiment of the invention is described by way of example with reference to the accompanying drawings, in which:

FIG. 1 is an overall view of a conventional installation for producing granulated TSP;

FIG. 4b is a section view on line D—D of FIG. 4a; and

It should nevertheless be understood that the drawings and the corresponding portions of the description are given purely to illustrate the invention and that they do not constitute any kind of limitation thereon.

DETAILED DESCRIPTION

Figures 2, 3:
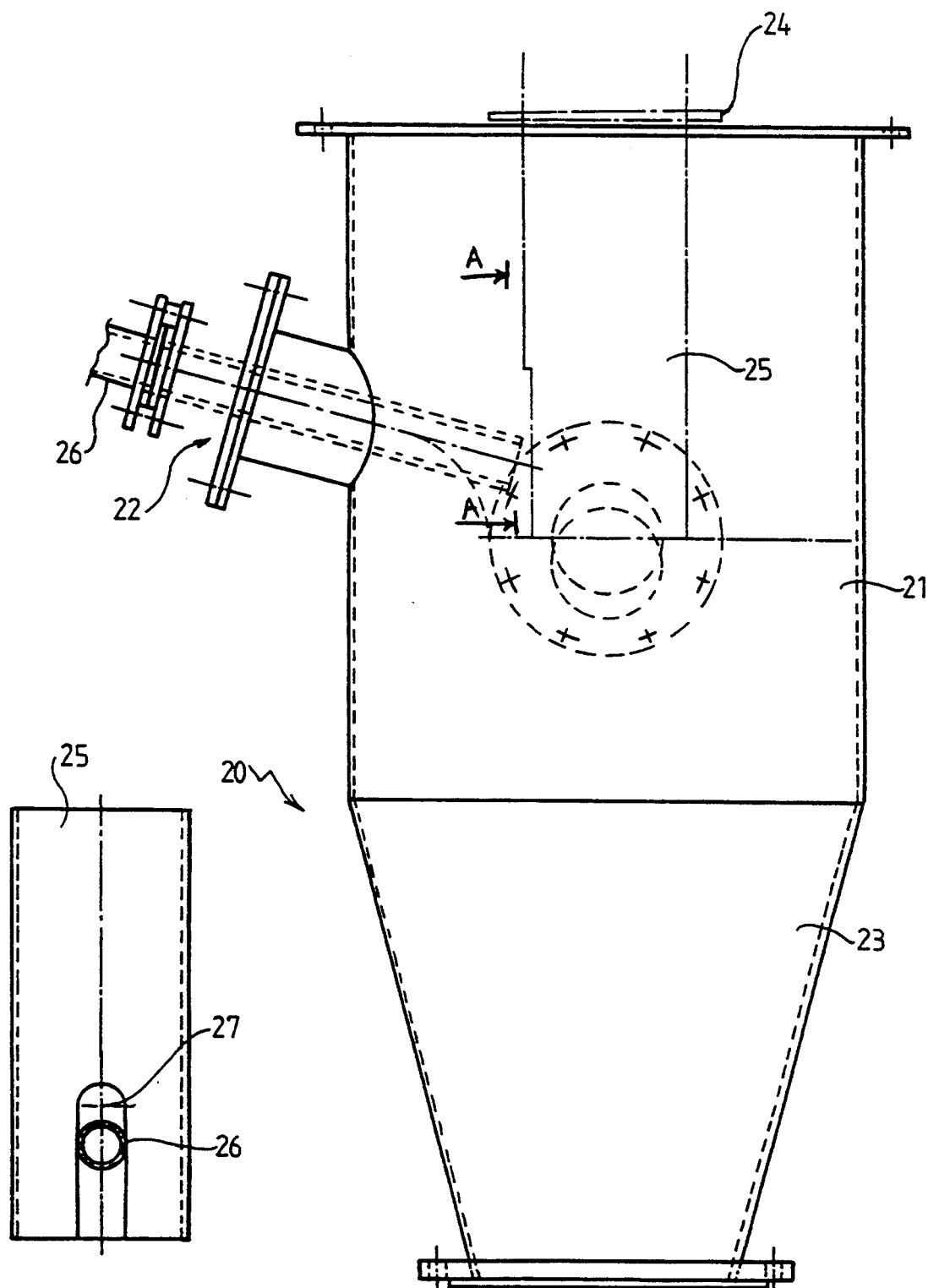
FIG. 2 is an elevation view of a self-unclogging premixer in accordance with the present invention.
FIG. 3 is a view on A—A of FIG. 2 showing the disposition of the acid sprayer relative to the flexible sleeve, serving simultaneously as the unclogging means and as a non-return valve for the reaction gases.

An installation for producing granulated triple superphosphate (TSP) conventionally comprises a buffer hopper 10 followed by a measuring-out strip 11 for measuring out previously ground phosphate, i.e. for measuring and controlling the phosphate flow rate. The phosphate measured out in this way falls under gravity via a chute (not shown) leaving the measuring-out strip to be fed into a premixer 20 in the form o a tapering cylinder. The cylindrical portion 21 of this premixer has at least one opening 22 (see FIG. 2) suitable for receiving a phosphoric acid sprayer 26 which injects the acid at a pressure lying in the range 0.3 bars to 0.8 bars. This acid is injected at a considerable angle relative to the phosphate that is fed in vertically, to ensure good mixing with the phosphate: in the context of the present invention, the angle is preferably equal to about 75°. In a conventional premixer, the tapering portion 23 is a site where large amounts of clogging and lumps are formed causing this conical portion to become blocked.

The premixer 20 is installed above a stirred-tank reactor 30 to which it is fixed by means of bolts. The reaction whereby the phosphoric acid attacks the phosphates takes place in this reactor.

This stirred-tank reactor 30 also receives steam in conjunction with the mixture of phosphoric acid and phosphate, with the addition of steam being necessary to activate the reaction and to maintain the slurry in the fluid state. This reaction tank is followed by a granulating drum 40 for granulating the slurry that leaves the tank.

A hot gas generator 50, in which a heavy fuel known as fuel "No. 2" is burned, produces drying gases and directs these gases into a tube 60 for drying the grains that come from the granulating drum 40. (No. 2 fuel has the following composition: C=84.5%; H=11%; O=0.38%; $N_2$=0.18% and S=4%, and it has a calorific value of 9,700 kcal/kg.) A bucket elevator 71 transports the dried grains to a level higher than the drying tube 60 so as to be able to distribute them by means of vibrating transporters such as 81 and 82 over two-stage riddles enabling the finished product to be split up into a predetermined grain size range, e.g. 2 mm to 4 ram. Each riddle co-operates with a respective grinder such as 101, 102, 103, and 104 to grind the reject from the riddles prior to recycling.

Similarly, each of the vibrating transporters 81 and 82 co-operates with a crusher such as 111 and 112 respectively to crush the reject from the vibrating transporters prior to recycling it to the granulating drum 40 into which the crushed and ground rejects are transported by means of a belt 12 and a bucket elevator 72.

Various gas scrubbing devices are provided in the installation. In particular, a scrubbing tower 121 is provided for using seawater to scrub the gases from the reactor and the granulating drum, while a venturi type scrubbing device 124 is provided for using untreated water to scrub the drying gases which are scrubbed a second time using seawater in a scrubbing tower 122. A third scrubbing tower 123 serves to scrub the waste gases from the apparatuses using untreated water. The various gases coming from the workshop and the drying device, and the waste gases from the apparatuses are propelled by means of fans such as 131, 132, and 133.

Naturally, grains having the desired grain size are transported by means of a belt 13 to a storage site.

Operations i to vi mentioned above with reference to the method of manufacturing granulated TSP are described below in detail.

i Preparing the Slurry

This step comprises the following operations:

mixing the phosphoric acid solution and the phosphate after it has been ground, screened, stored, and measured out in the reactor prior to the reaction per se;

allowing the acid solution to attack the phosphate prepared in this way; and maintaining the reaction medium at the reaction temperature, in particular in the range 90° C. to 110° C.

More precisely, the phosphate ground so that 80% to 95% passes through a 160 μm screen is stored in a buffer hopper having a working volume of about 4 m³. This hopper feeds the measuring-out equipment 11 directly via a cellular airlock. On leaving the measuring-out equipment, the phosphate flows under gravity into the self-unclogging premixer 20 of the invention which also receives phosphoric acid laterally at a previously measured-out concentration lying in the range 38% to 45% of $P_2O_5$, and suitable for attacking the phosphate (in phosphate compounds, the phosphorous content is expressed in the form of content of $P_2O_5$, i.e. phosphorous pentoxide, which unit for measuring concentration is common practice with manufacturers and users of fertilizer). The phosphoric acid flow rate is servo-controlled to the phosphate flow rate and the acid is injected in such a manner as to ensure good contact with the phosphate. The mixture obtained in this way flows out directly into the stirred-tank reactor 30 disposed beneath the premixer 20.

In this stirred-tank reactor, i.e. in the reaction tank, the reaction between the phosphate and the phosphoric acid continues. The temperature of the reaction medium is maintained between 90° C. and 110° C. as already mentioned above by injecting steam directly into several points in the reactor. After a transit time of 5 minutes to 20 minutes, the slurry flows out under gravity into the granulating drum 40.

The slurry circuit is designed so as to avoid any blocking due to the slurry setting or to the formation of pockets of gas.

All of the materials that come into contact with the slurry are suitable for withstanding operating conditions.

The gases given off by the reaction are taken off and scrubbed as mentioned above.

ii Granulating

This step is performed in the above-mentioned rotary granulating drum which receives both the slurry from the reactor and recycled products from step vi.

Because the slurry overflows from the reaction tank into the granulating drum, the tank is installed above the granulating drum and at a sufficient height, i.e. the relative positioning of the reactor and of the granulating drum is chosen in such a manner as to ensure that the slurry is properly pulverized.

The granulating drum is designed to make it easy to monitor and control the medium being granulated. The drum is made of material that withstands its operating conditions and it is also fitted with the necessary unclogging means, that are of conventional type.

The gases coming from the granulating drum are drawn off and mixed with the reaction gases prior to scrubbing.

The product granulated in this way falls under gravity directly into the drying tube 60.

The efficiency of the granulation and the quality of the final product are considerably better than in the prior art.

iii Drying

This step takes place with a counter-flow using the hot gases obtained by burning the No. 2 heavy fuel in the independent hot gas generator 50 which feeds via a coupling directly into the above-mentioned drying tube, and which is of conventional design.

iv Separation by grain size

The granulated product leaving the drying tube is taken up directly by a bucket elevator 71 which feeds two vibrating transporters 81 and 82 via a simple Y-shaped chute. Each transporter is fitted with a grid enabling grain sizes greater than the selected value to be separated out and is made up of two elements operating in series, each feeding a two-stage riddle (cf. above-mentioned references 91 to 94).

After riddling, grains in the range 2 mm to 4 mm constitute the finished granulated product which is sent directly to a storage zone.

A shutter box placed on the finished granulated product circuit makes it possible to recycle a portion thereof.

The material that passes through the riddles (the filtrate) is returned directly for recycling while the rejected material is ground and then injected into the recycling circuit. The recycled products are returned to the granulating drum 40 by the recycling belt 12 and another bucket elevator 72.

In addition, scales integrated in and installed in the recycling belt make it possible to monitor the tonnage returned to the granulator.

The recycling rate, i.e. the ratio between the recycled tonnage in the granulator and the tonnage produced is close to three.

Under such circumstances, it is thus clear that the grain size separation step also includes the following operations:

storing the separated-out grain size range;
  recycling the material that passes through the riddles together with a fraction of the finished product; and
  weighing the recycled products.

v Disposal of and scrubbing of the gases

The installation is also fitted with waste disposal circuits, such as:

a) a waste disposal circuit for the reactor and the granulating drum: to this end, two fans (not shown in FIG. 1) apply suction to these two apparatuses which are maintained at reduced pressure, thereby preventing them emitting gases into the atmosphere of the workshop. These wet gases contain above all water vapor, $CO_2$, and fluorides that are given off during the chemical reaction, and they are mixed and scrubbed using seawater;

b) a waste disposal circuit for the drying tube: the gases from the drier are initially de-dusted in a battery of cyclones 61, and then scrubbed with untreated water in the venturi 124 to recover the dust that is not trapped in the cyclones 61; thereafter the gases are scrubbed using seawater in a final tower 122 before being dumped into the atmosphere; and c) a waste disposal circuit for the workshop: in order to avoid polluting gases being given off into the workshop, the operations that generate dust, in particular grinding the phosphate, granulation, grain size separation, and recycling on a belt, are all performed under reduced-pressure conditions requiring dust to be sucked out by fans that apply suction at various different points.

To sum up the waste disposal operations mentioned above under headings a) to c), it should be specified that they include:

establishing and maintaining reduced pressure in the reactor and the granulator, i.e. performing the chemical reactions and the granulation under conditions of reduced pressure; and de-dusting the drying gases (by means of a battery of cyclones); together with:

de-dusting and scrubbing in untreated water the gases that are sucked up with dust, prior to dumping them into the atmosphere;

recycling the solution used for scrubbing these gases when scrubbing the drying gases; and reusing said recycled and concentrated scrubbing solution for the reaction or the granulating operations.

The disposition of the apparatuses and the design of the waste disposal circuits in question ensure that waste is properly disposed of from the installation overall.

The waste gases from the workshop are partially loaded with dust and they pass through another, independent battery of cyclones 62 after which they are scrubbed with untreated water in a cyclone tower 123 prior to being dumped into the atmosphere.

The solution for scrubbing the waste gases from the workshop is also recycled to the first scrubbing stage for the gases from the drier. After the scrubbing solution has been concentrated in the first stage, it is reinserted into the reactor or the granulator (to avoid recycling a great deal of water in the process, it is necessary to maintain the same scrubbing solution in circulation until it has become charged, prior to recycling it).

Now that the installation and the method of manufacturing granulated TSP have been described, the premixer 20 is described in greater detail since, according to the invention, it is designed in such a manner as to avoid becoming blocked or clogged in its tapering portion 23, and also to avoid any gases moving back out therefrom since they could condense in the measuring-out equipment 11.

To this end, the cylindrical portion 21 of the premixer contains in combination at least one acid sprayer 26 together with a flexible sleeve of non-vulcanized natural or synthetic rubber 25 (cf. also FIG. 3) which is fixed at its top end by means of a collar 24. The sleeve is provided with at least one window or slot 27 for receiving the sprayed jet of phosphoric acid under pressure, with the number of slots being linked to the number of acid sprayers actually used. Under the effect of the pressure from said acid, the free end of the flexible sleeve 25 is set into motion, and the greater the injection pressure of the sprayed acid, the greater said motion, thereby ensuring thorough mixing with the ground phosphate that passes through the sleeve and continuously renewing the discharge point thereof. By using this sleeve, the tapering portion of the premixer is continuously cleaned such that there are no longer any dead zones: the advantage of this disposition will be understood when account is taken of the fact that the formation of the above-mentioned lumps begins specifically in said dead zones. The sleeve also acts as a non-return valve under the effect of phosphoric acid injection and because of its own resilience, and as a result it prevents gases from rising. In operation, the top portion of the sleeve is full of phosphates and so it is cylindrical in shape, whereas deeper down inside the premixer, the sleeve takes up a shape that is more or less elliptical and its motion accelerates under the effects of acid injection and of the resilience of the rubber, such that the bottom portion of the sleeve which is weakened by having the slot therein thus tends to close during operation, thereby enabling it to act as a non-return valve.

Figure 4A:
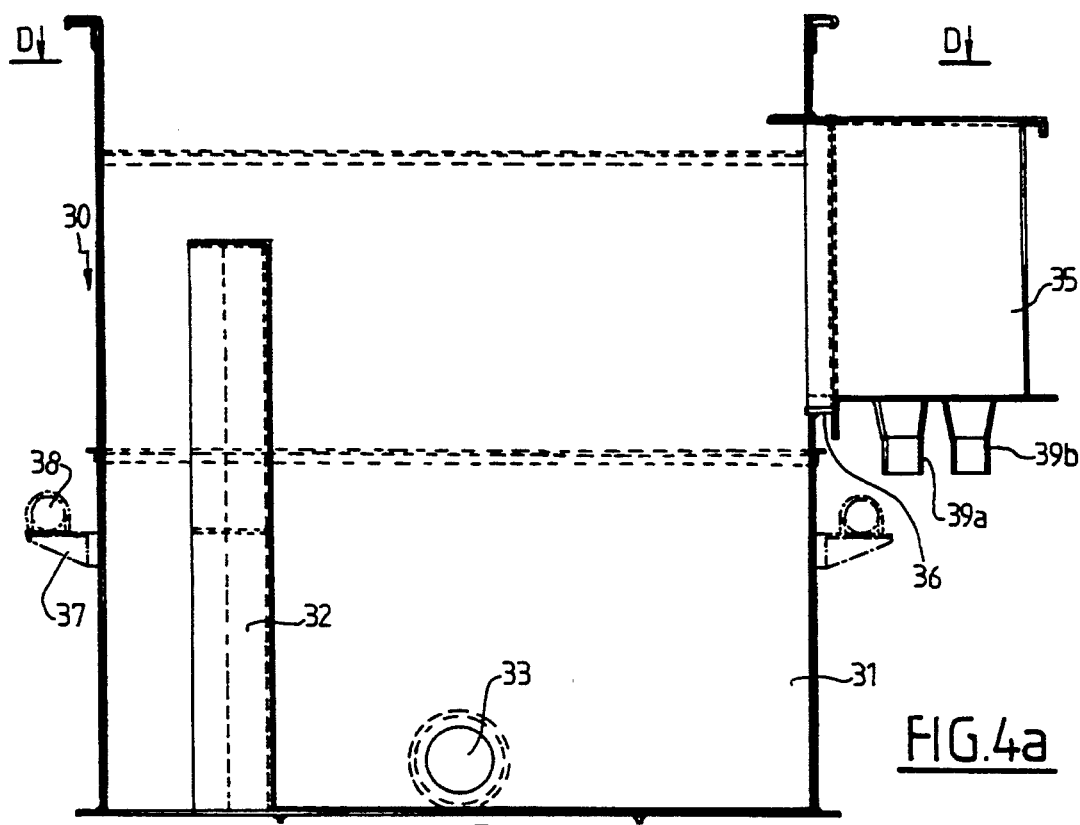
FIG. 4a is a section view (on line A—A of FIG. 4b) of a reaction tank fitted with an overflow spout.
Figure 4B:
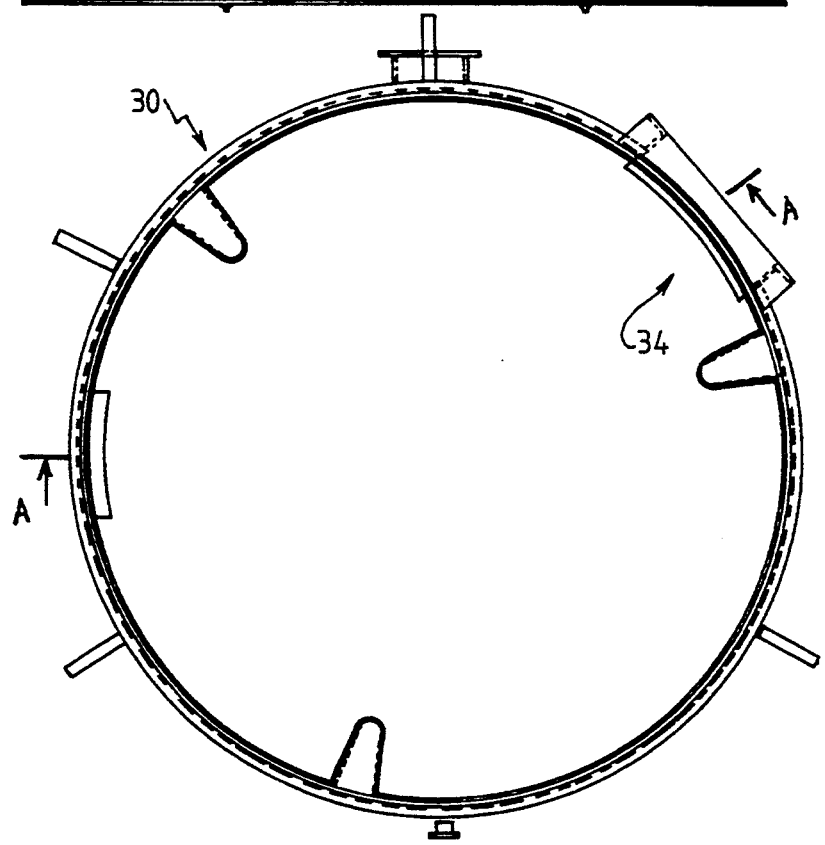

The stirred-tank reactor 30 (cf. FIGS. 4a and 4b) comprises a reaction tank proper 31, an anti-vortex baffle 32, a discharge hole 33, a slurry overflow opening 34, a slurry overflow chute 35, a flange 36 for fixing the overflow chute to the tank, and a support 37 for supporting a ring manifold 38 for feeding steam into the tank.

The stirred-tank reactor satisfies the following requirements:

it provides good chemical efficiency;
it reduces losses;
it improves granulation;
it improves the reliability of the equipment;
it facilitates maintenance; and
it reduces investment and maintenance costs.

It should also be observed that the position of the premixer relative to the reactor conditions the transit time of the slurry therein and losses due to gases and dust flying off.

The slurry overflow chute 35 installed facing the overflow opening 34 of the reaction tank 31 receives the slurry which then passes through two tapering openings 39a and 39b to flow along a duct 39c leading to the granulator 40 (cf. FIG. 1) which duct is, in practice, semicircular in shape. The top portion of the overflow chute 35 is provided with a removable portion: the two tapering openings 39a and 39b are thus easily isolated and cleaned when necessary, their shape making it possible to separate out the gases that are given off during flow towards the granulator.

In conventional installations for manufacturing granulated TSP, this portion of the circuit has always been the main bottleneck. The clogging nature of the slurry and the way in which vapor and gases are continuously given off quickly cause this circuit to become blocked or cause a pump to become unprimed, assuming that a pumping system is in use.

Figure 5A:
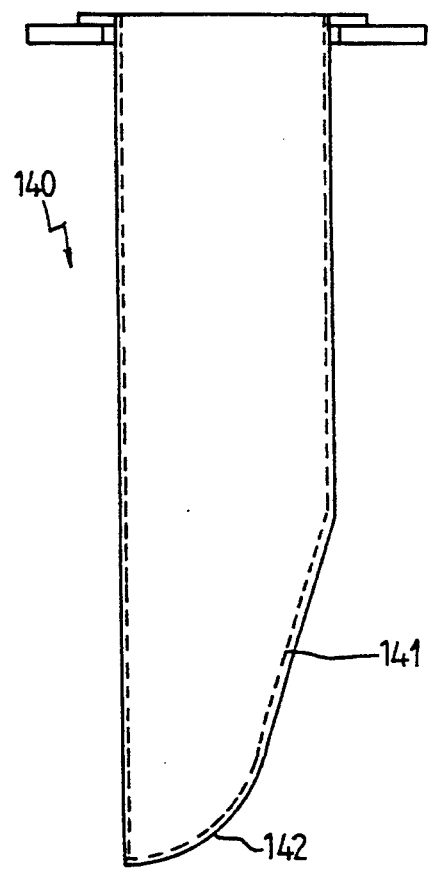
FIGS. 5a and 5b are a side elevation view (a) and a front elevation view (b) of a slurry sprayer used in the context of the present invention.
Figure 5B:
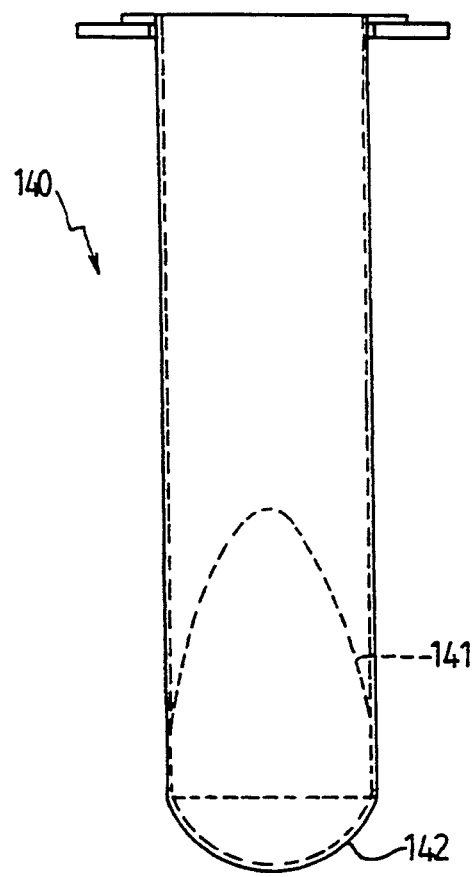

This overflow chute of the invention makes it possible to continuously separate out the gas, thereby greatly improving the operation of the circuit and consequently the following granulation inside the granulating drum 40. The drum cooperates with a slurry sprayer 140 (cf. FIG. 5) which enables the slurry to be distributed over the bed of the granulator: because of the design of this sprayer, the jet of slurry takes the form of a fan which covers a large area of said bed. In addition, rotation of the granulator drum serves to renew this bed continuously. Such a distribution of the slurry inside the granulator makes it possible to obtain better bonding between the grains without leading to large lumps being formed. The spraying speed is kept constant by varying the section.

The advantages of this sprayer thus consist in enabling granulation to be improved, in reducing the recycling rate, since there is no longer any need to recycle a large quantity of product to absorb the moisture of the slurry, and also in reducing the build-up of solids inside the granulating drum.

The slurry sprayer 140 presents the outlet end for slurry from the overflow chute of the reactor with a composite profile which is defined by a sloping cutout 141 inclined substantially at 20° relative to the axis of the sprayer, and by an arcuate cutout 142 disposed immediately beneath the preceding cutout and connected thereto.

I claim:

1. A method of producing granulated triple superphosphate, comprising the following steps:

i preparing a slurry of previously ground phosphate and a solution of phosphoric acid;

ii granulating the slurry;
iii drying the granulated product;
iv separating the granulated product by grain size;
v disposing of and scrubbing waste gases; and
vi recycling rejected finished product after grain size separation;

the improvement comprising:

preparing the slurry of step i via a premixing operation using a premixer for the phosphate and the acid with said premixer being situated upstream from a reactor having a reaction tank in which the acid solution attacks the granulated phosphate, with said premixing operation accomplished by guided insertion of the previously ground and measured-out phosphate into the premixer through a flexible tube having a free end defining a confined area and with said flexible tube being deformable along an axial path and by spraying the phosphoric acid solution into the premixer under pressure through the confined area of said tube for contacting the phosphate at the end of the guided axial insertion path at an oblique angle relative to the direction of said phosphate whereby the free end of said flexible tube is set in motion to randomly move about said premixer by the pressure from said acid for ensuring thorough premixing of the phosphate within said premixer without clogging.

2. A method according to claim 1, wherein said angle is measured in a vertical plane between the spraying direction and the guided axial insertion path for the phosphate with said angle lying between 60° and about 75°.

* * * * *